United States Patent [19]

Siddall

[11] 3,711,516

[45] Jan. 16, 1973

[54] ALIPHATIC ETHERS AND THIO COMPOUNDS

[75] Inventor: John B. Siddall, Palo Alto, Calif.

[73] Assignee: Zoecon Corporation, Palo Alto, Calif.

[22] Filed: Feb. 25, 1970

[21] Appl. No.: 14,217

[52] U.S. Cl. .........260/340.5, 260/345.9, 260/347.8, 260/470, 260/473 R, 260/607 A, 260/607 R, 260/609 B, 260/611 R, 260/611 A, 260/614 A, 260/632 R, 424/282
[51] Int. Cl. .............................................C07d 13/10
[58] Field of Search....................................260/340.5

[56] References Cited

UNITED STATES PATENTS 3,563,982  2/1971  Bowers.........................260/340.5 X

*Primary Examiner*—Alex Mazel
*Assistant Examiner*—James H. Turnipseed
*Attorney*—Donald W. Erickson

[57] ABSTRACT

Aliphatic hydrocarbon alcohols, ethers, thioethers, sulfinyl and sulfonyl compounds having terminal tertiary alkyl group useful in insect control, perfumery, plastics and as intermediates.

6 Claims, No Drawings

ALIPHATIC ETHERS AND THIO COMPOUNDS

This invention relates to novel aliphatic compounds. More particularly, the present invention relates to novel quaternary alkylated aliphatic compounds of the following formula A:

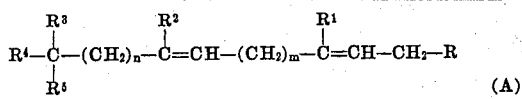

wherein,
m is an integer of 1 to 4;
n is an integer of 1 to 4;
each of $R^1$, $R^2$, $R^3$, $R^4$ and $R^5$ is lower alkyl; and
R is the group —OH, —SH, —$OR^6$, —$SR^6$,

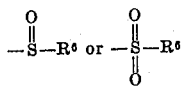

in which,
$R^6$ is alkyl, cycloalkyl, aralkyl, alkenyl, 3′,4′-methylenedioxyphenyl, 3′,4′-methylenedioxybenzyl, tetrahydro-furan-2′-yl, tetrahydropyran-2′-yl or the group

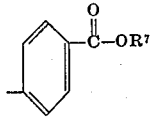

in which $R^7$ is lower alkyl, cycloalkyl or aralkyl.

The term "alkyl," as used herein, refers to a straight or branched chain saturated aliphatic hydrocarbon group having a chain length of one to 12 carbon atoms, such as methyl, ethyl, n-propyl, i-propyl, n-butyl, n-hexyl, n-amyl, n-octyl, n-nonyl, lauryl, n-decyl, t-amyl, 3-ethylpentyl and 2-methylhexyl. The term "alkenyl," as used herein, refers to an ethylenically unsaturated hydrocarbon group, branched or straight chain, having a chain length of two to 12 carbon atoms, such as alkyl, vinyl, 3-butenyl, 2-butenyl, 2-hexenyl and i-propenyl. Whenever the foregoing terms are modified by the word "lower," the chain length of the group is not more than six carbon atoms. The term "cycloalkyl," as used herein, refers to a cycloalkyl group of four to eight carbon atoms, i.e., cyclobutyl, cyclopentyl, cyclohexyl, cycloheptyl and cyclooctyl. The term "aralkyl," as used herein, refers to an aralkyl group of seven to 12 carbon atoms, such as benzyl, phenylethyl, methylbenzyl and naphthylmethyl.

The present invention also provides a novel method for the control of insects which comprises treating the insects with an effective amount of a compound of formula A. To aid in achieving uniform and economical application, it is advantageous to employ a composition comprising an inert carrier and a compound of formula A. These compositions can be either liquid or solid. The exact formulation employed will vary according to factors, such as the specie of insect to be treated, the stage of the insect's life at time of treatment, the degree or extent of insect infestation, environmental conditions and type of application. The most advantageous formulation for the control of a specific insect is determinable by those of ordinary skill in the art by routine experimentation giving due consideration to the foregoing factors and the description herein.

The formulation employed is also dependent upon the primary role or mechanism of treating the insects— that is, topical application (absorption), per oral application (ingestion), chemosterilant (sterility) or vaporization (inhalation). The primary mode of treating insects is, in turn, dependent on whether the insect is a chewing insect, a sucking insect or flying insect; whether the control of the insect is sought at the embryo, larvae, pupae or adult stage; and the locus of the insect.

Formulations can be prepared by incorporating a compound of formula A with a solid inert carrier, such as finely divided talc, silica, pyrophyllite or clay or granular inert carriers, such as the vermiculites or a liquid inert carrier, such as acetone, xylene, peanut oil, cottonseed oil, sesame oil and other vegetable and mineral oils conventionally employed as carriers in formulations for insect control. Other components can be included, such at emulsifying agents, wetting agents and dispersing agents. Generally, the formulation will contain less than 95 percent by weight of the compound and more frequently less than 25 percent. Depending upon the particular insect being treated and the particular stage of the life cycle at the time of treatment, control of insects by treating the insects with a compound of formula A is accomplished by the compound's ability to: inhibit metamorphosis; act as a direct insecticide, particularly at the embryo stage; act as a chemosterilant; or break the diapause of the insect.

Treatment of insects by vapor action can be accomplished, for example, by formulating a compound of formula A with a resinous material, such as the vinyl polymers, e.g., polyvinyl chloride. This method is particularly useful for flying insects and treating enclosed areas. Suitable formulating methods and carriers are described in U.S. Pat. No. 3,318,769, for example.

Although not intending to be limited by a theoretical explanation, it appears that the effectiveness of the compounds of formula A can be traced to their ability to mimic the activity of juvenile hormone substances. Juvenile hormone was identified as methyl 10,11-oxido-7-ethyl-3,11-trimethyltrideca-2,6-dienoate using an extract of Cecropia moths by Roeller at al., *Angew. Chem. internat. Edit. 6*, 179 (1967) and *Chemical & Engineering New*, 48–49 Apr. 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth," *Zoology (Proc. N.A.S.) 60*, 853 (1968). In addition to the natural juvenile hormones, some synthetic terpenoids have been reported exhibiting maturation inhibiting, sterility or ovicidal activity. Bowers et al., *Life Sciences Oxford) 4*, 2323 (1965); *BioScience 18, No. 8*, 791 (August, 1968); Williams, *Scientific American 217*, No. 1, 13 (July, 1967); *Science 154*, 248 (Oct. 14, 1966); Romanuk et al., *Proc. Nat. Acad. Sci. 57*, 349 (1967); Masner et al., *Nature 219*, 395 (July 27, 1968 ); U.S. Pat. Nos. 3,429,970 and 3,453,362; and Bowers, "Juvenile Hormone: Activity of Aromatic Terpenoid Ethers," *Science 164*, 323 (April, 1969).

In the application of the compounds of formula A, it is more economical and expedient to use a mixture of isomers to avoid separation processing. As individual isomers, the trans, trans isomer is preferably employed for the control of insects.

Typical insects which can be controlled by treatment with a compound of formula A in accordance with the present invention are *Dysdercus cingluatus, Tenebrio molitor, Galleria mellonella, Tribolium confusm, Periplaneta americana, Hypera puctata* (clover leaf weevil), *Dysdercus suturellus*, Aphididae, such as melon aphid and cabbage aphid, *Tinea pellionella, Sitophilus granarius, Lygus hesperus* and *Schistocerca vaga*.

In the description hereinafter, each of R, $R^1$, $R^2$, $R^3$, $R^4$, $R^5$, $R^6$, $R^7$, $m$ and $n$ are as defined hereinabove.

The compounds of formula A are prepared according to the following outlined procedures.

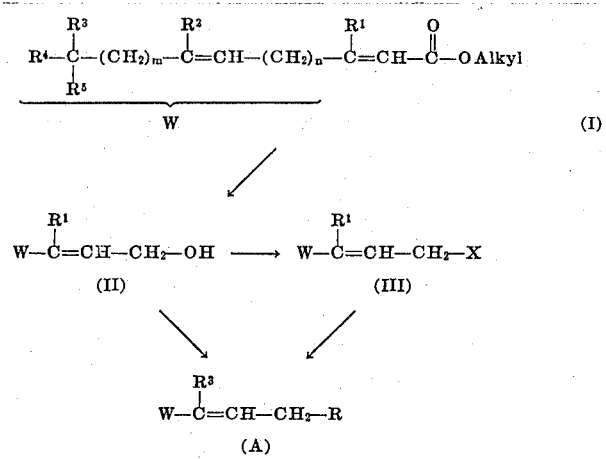

In the above formulas, Alkyl represents lower alkyl and X is bromo or chloro.

In the practice of the above processes, an ester of formula I upon reduction with a reducing agent, such as lithium aluminum hydride, sodium borohydride, and the like, yields a C-1 alcohol of the formula II. The alcohol (II) on treatment with a halogenating agent, such as phosphorus trichloride, phosphorus tribromide, and the like, furnishes the C-1 bromide or C-1 chloride of formula III. The compounds of formula II and III are then converted into the compounds of formula A.

Compounds of formula A wherein R is the group —$OR^6$ can be prepared by treating a halide of formula III with an alcohol corresponding to the ether desired, e.g., methanol, ethanol, benzyl alcohol, cyclopentanol, cyclohexanol, sesamol, piperonyl alcohol, 1-hexanol, 3-methyl-1-butanol, t-amyl alcohol, β-phenylethanol, p-methylbenzyl alcohol, t-butyl alcohol, allyl alcohol, 4-hexen-1-ol, neopentanol, methyl 4-hydroxybenzoate, and the like, in the presence of potassium hydroxide, sodium hydroxide or an alkoxide, such as sodium t-butoxide, sodium methoxide or potassium t-butoxide. Generally, a slight molor excess of the alcohol and base is used along with an organic solvent inert to the reaction, such as dimethoxyethane acetone. The tetrahydropyranyl ether and tetrahydrofuranyl ether are prepared by treatment of an alcohol of formula III with dihydropyran and dihydrofuran, respectively, in the presence of a catalyst, such as p-toluenesulfonyl chloride, methanesulfonyl chloride, and the like. The ethers (—$OR^6$) can also be prepared by the dehydration of the alcohol (II) and the alcohol of the ether desired. The dehydration can be accomplished using an acid, such as sulfuric acid or p-toluenesulfonyl chloride.

Similarly, the compounds of formula A wherein R is the group —$SR^6$ can be prepared by treating a halide of formula III with a thio alcohol corresponding to the thio ether desired, such as methyl mercaptan, ethyl mercaptan, allyl mercaptan, benzyl mercaptan, β-phenylethyl mercaptan, n-propyl mercaptan, n-amyl mercaptan, t-amyl mercaptan, sesamolyl mercaptan, n-hexyl mercaptan, and the like, in the presence of sodium hydroxide, sodium alkoxide, and the like. Treatment of a halide of formula III with hydrogen sulfide in alcohol in the presence of base, such as sodium hydroxide, potassium hydroxide, sodium, and the like furnishes a compound of formula A wherein R is —SH. The mercaptan (A; R is —SH) on treatment with sodium hydroxide, potassium hydroxide, sodium ethoxide, or the like, furnishes an alkali mercaptide which on treatment with a halide of the formula X—$R^6$ (X is bromo or chloro) furnishes the thio ether or sulfides of formula A wherein R is —$SR^6$.

The sulfinyl and sulfonyl compounds of formula A are prepared as outlined below:

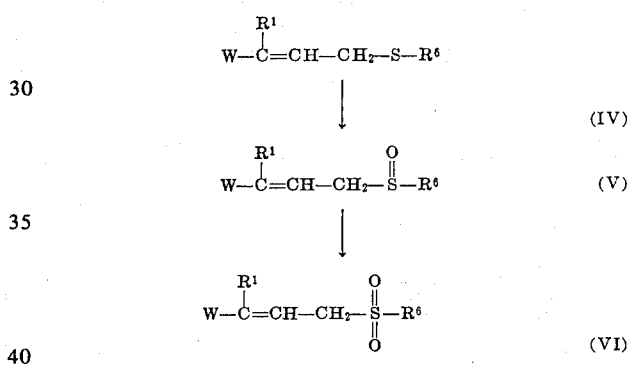

In the above process, the thio ether (IV) is treated with sodium metaperiodate, hydrogen peroxide, or the like, about one molar equivalent, at a temperature of from about 0° to 20°C for about 1 to 6 hours to furnish the sulfinyl (V). The reaction usually affords some of the sulfonyl (VI) also which can be separated by chromatography if desired. By using a higher molar reaction of sodium periodate, hydrogen peroxide, higher temperature and longer reaction time, the reaction favors formation of the sulfonyl (VI). Reagents and conditions suitable for the above transformation (IV-VI) are described by N.J. Leonard et al., *Journal of Organic Chemistry* 27, 282 (1962).

The esters (I) and alcohols (II) are described and the synthesis thereof in my application Serial No. 7,987, filed Feb. 2, 1970, entitled "Aliphatic Esters," the disclosure of which is incorporated by reference.

The compounds of formula A are useful in perfumery, particularly when R is —OH, and as intermediates for perfumes. The compounds of formula A, when R is —SH or —$SR^6$, are useful crosslinking agents for hydrocarbon polymers, such as rubber, SBR, polybutadiene and other unsaturated polymers.

The following examples provide detailed procedures for the preparation of the compounds of the present invention and serve to illustrate the synthesis thereof and the practice of the invention. Temperature in degrees Centigrade.

In the processes described herein, there can be employed a mixture of the isomers of the starting material or a single isomer. In the case of compounds prepared for the control of insects, it is preferable to use a trans, trans isomer as the starting material. The isomers are separated by conventional techniques, such as gas-liquid chromatography or fractional distillation, either to the processes described herein or after completion of the reaction.

EXAMPLE 1

A. A solution of 2 g. of methyl 3,7,11,11-tetramethyldodeca-2,6-dienoate in 20 ml. of dry ether is added with stirring to 0.4 g. of lithium aluminum hydride covered in ether at 0°. After about 1 hour, 2.5 ml. of acetic acid is added. The mixture is washed with ice water and the ether phase dried and evaporated to yield 3,7,11,11-tetramethyldodeca-2,6-dien-1-ol.

Similarly, each of methyl 3,7,11,11-tetramethyltrideca-2,6-dienoate and methyl 3,7,11,11-trimethyl-7-ethyltrideca-2,6-dienoate is reduced to 3,7,11,11-tetramethyltrideca-2,6-dien-1-ol and 3,11,11-trimethyl-7-ethyltrideca-2,6-dien-1-ol.

B. By repeating the process of Part A using each of the methyl esters listed in Column I as the starting material, the corresponding C-1 alcohol listed in Column II is obtained.

COLUMN I methyl 3,9,13,13-tetramethylpentadeca-2,8-dienoate,
methyl 3,8,12,12-tetramethyltetradeca-2,7-dienoate,
methyl 3,6,10,10-tetramethyldodeca-2,5-dienoate,
methyl 3,7-diethyl-11,11-dimethyltrideca-2,6-dienoate,
methyl 3,12,12-trimethyl-8-ethyltetradeca-2,7-dienoate,
methyl 3,10,10-trimethyl-6-ethyldodeca-2,5-dienoate,
methyl 3,13,13-trimethyl-9-ethylpentadeca-2,8-dienoate,
methyl 3,11,11-trimethyl-7-ethyldodeca-2,6-dienoate and
methyl 3,7,9,9-tetramethyldeca-2,6-dienoate.

COLUMN II 3,9,13,13-tetramethylpentadeca-2,8-dien-1-ol,
3,8,12,12-tetramethyltetradeca-2,7-dien-1-ol,
3,6,10,10-tetramethyldodeca-2,5-dien-1-ol,
3,7-diethyl-11,11-dimethyltrideca-2,6-dien-1-ol,
3,12,12-trimethyl-8-ethyltetradeca-2,7-dien-1-ol,
3,10,10-trimethyl-6-ethyldodeca-2,5-dien-1-ol,
3,13,13-trimethyl-9-ethylpentadeca-2,8-dien-1ol,
3,11,11-trimethyl-7-ethyldodeca-2,6-dien-1-ol and
3,7,9,9-tetramethyldeca-2,6-dien-1-ol.

C. To a mixture of 4 g. of 3,7,11,11-tetramethyldodeca-2,6-dien-1-ol and 25 ml. of benzene at 0° is added a solution of 5 ml. of phosphorus tribromide in 18 ml. of benzene over about 15 minutes. The mixture is stirred at 0° for 1 hour and then heated at about 35° for 2 hours. The mixture is then poured into ice and extracted with pentane. The extracts are combined, washed with aqueous sodium bicarbonate, water and then brine, dried over magnesium sulfate and evaporated to yield 1-bromo-3,7,11,11-tetramethyldodeca-2,6-diene.

By use of the above procedure, each of 3,7,11,11-tetramethyltrideca-2,6-dien-1-ol and 3,11,11-trimethyl-7-ethyltrideca-2,6-dien-1-ol is converted into 1-bromo-3,7,11,112,6-diene and 1-bromo-3,11,11-trimethyl-7-ethyltrideca-2,6-diene.

By repeating the foregoing process using phosphorus trichloride in place of phosphorus tribromide, the corresponding C-1 chlorides are obtained, i.e. 1-chloro-3,7,11,11-tetramethyldodeca-2,6-diene, 1-chloro-3,7,11,11-tetramethyltrideca-2,6-diene and 1-chloro-3,11,11-trimethyl-7-ethyltrideca-2,6-diene.

D. The process of Part C is repeated using as the starting material each of the C-1 alcohols listed in Column II to yield the corresponding C-1 bromide listed in Column III.

COLUMN III 1-bromo-3,9,13,13-tetramethylpentadeca-2,8-diene,
1-bromo-3,8,12,12-tetramethyltetradeca-2,7-diene,
1-bromo-3,6,10,10-tetramethyldodeca-2,5-diene,
1-bromo-3,7-diethyl-11,11-dimethyltrideca-2,6-diene,
1-bromo-3,12,12-trimethyl-8-ethyltrideca-2,7-diene,
1-bromo-3,10,10-trimethyl-6-ethyldodeca-2,5-diene,
1-bromo-3,13,13-trimethyl-9-ethylpentadeca-2,8-diene,
1-bromo-3,11,11-trimethyl-7-ethyldodeca-2,6-diene and
1-bromo-3,7,9,9-tetramethyldeca-2,6-diene.

Similarly, using phosphorus trichloride, the chlorides corresponding to the bromides of Column III are prepared.

EXAMPLE 2

The process of Example 1 (Part A) is repeated with the exception of using each of the methyl esters listed in Column IV to yield the corresponding C-1 alcohols listed in Column V.

COLUMN IV methyl 3,9,13,13-tetramethyltetradeca-2,8-dienoate,
methyl 3,8,12,12-tetramethyltrideca-2,7-dienoate,
methyl 3,6,10,10-tetramethylundeca-2,5-dienoate,
methyl 3,7-diethyl-11,11-dimethyldodeca-2,6-dienoate,
methyl 3,12,12-trimethyl-8-ethyltrideca-2,7-dienoate,
methyl 3,10,10-trimethyl-6-ethylundeca-2,5-dienoate and
methyl 3,13,13-trimethyl-9-ethyltetradeca-2,8-dienoate.

COLUMN V 3,9,13,13-tetramethyltetradeca-2,8-dien-1-ol,
3,8,12,12-tetramethyltrideca-2,7-dien-1-ol,
3,6,10,10-tetramethylundeca-2,5-dien-1-ol,
3,7-diethyl-11,11-dimethyldodeca-2,6-dien-1-ol,
3,12,12-trimethyl-8-ethyltrideca-2,7-dien-1-ol,
3,10,10-trimethyl-6-ethylundeca-2,5-dien-1-ol and
3,13,13-trimethyl-9-ethyltetradeca-2,8-dien-1-ol.

The process of Example 1 (Part C) is repeated with the exception of using as the starting material each of the C-1 alcohols listed in Column V to yield the C-1 bromides listed in Column VI.

COLUMN VI 1-bromo-3,9,13,13-tetramethyltetradeca-2,8-diene,
1-bromo-3,8,12,12-tetramethyltrideca-2,7-diene,
1-bromo-3,6,10,10-tetramethylundeca-2,5-diene,
1-bromo-3,7-diethyl-11,11-dimethyldodeca-2,6-diene,
1-bromo-3,12,12-trimethyl-8-ethyltrideca-2,7-diene,
1-bromo-3,10,10-trimethyl-6-ethylundeca-2,5-diene and
1-bromo-3,13,13-trimethyl-9-ethyltetradeca-2,8-diene.

Similarly, the C-1 chlorides of the C-1 alcohols of Column V are prepared using phosphorus trichloride.

EXAMPLE 3

A. To 1 g. of 3,7,11,11-tetramethyldodeca-2,6-dien-1-ol in 20 ml. of dry ether is added one molar equivalent of diazoethane. One drop of boron/trifluoride is added and the mixture allowed to stand 1 hour at 0° and then at room temperature for 2 additional hours. The mixture is then washed with water and organic phase evaporated to yield the ethyl ether of 3,7,11,11-tetramethyldodeca-2,6-dien-1-ol.

The use of diazomethane and diazopropane in the foregoing procedure affords the methyl ether and propyl ether.

B. One g. of 3,7,11,11-tetramethyldodeca-2,6-dien-1-ol in 10 ml. of diglyme is added dropwise to a slurry of 1 g. of sodium hydride in 10 ml. of diglyme under nitrogen. To this mixture is added 0.9 g. of 2-chlorotetrahydropyran. The reaction mixture is stirred at about 25° for 30 minutes and then quenched in ice water. The organic phase is separated and aqueous phase re-extracted with ether. The organic materials are washed with water, dried over sodium sulfate and evaporated to yield the tetrahydropyran-2-yl ether of 3,7,11,11-tetramethyldodeca-2,6-dien-1-ol.

By using 2-chlorotetrahydrofuran in the above procedure, the tetrahydrofuran-2-yl ether is obtained. Similarly, through the use of each of cyclohexyl chloride and cyclopentyl chloride in the foregoing procedure, the corresponding cyclohexyl ether and cyclopentyl ether are obtained.

Each of 3,7,11,11-tetramethyltrideca-2,6-dien-1-ol and 3,11,11-trimethyl-7-ethyltrideca-2,6-dien-1-ol is used as the starting material in Part A to yield the corresponding ethyl ether. Similarly, each of the C-1 alcohols listed under Column II and Column V can be used as the starting material in the processes of Parts A & B to furnish the corresponding ethers.

EXAMPLE 4

To a solution of 2 g. of sodium hydroxide in 40 ml. of methanol saturated with hydrogen sulfide is added 10 g. of 1-bromo-3,7,11,11-tetramethyldodeca-2,6-diene. The mixture is stirred at about 25° for about 5 hours with continued introduction of hydrogen sulfide. The mixture is then diluted with water and extracted with petroleum ether. The organic phase is separated, washed well with water, dried over sodium sulfate and evaporated under reduced pressure to yield 3,7,11,11-tetramethyldodeca-2,6-dienyl mercaptan (3,7,11,11-tetramethyldodeca-2,6-dien-1-thiol) which can be purified by chromatography.

Similarly, each of 1-bromo-3,7,11,11-tetramethyltrideca-2,6-diene and 1-bromo-3,11,11-trimethyl-7-ethyltrideca-2,6-diene are converted into 3,7,11,11-tetramethyltrideca-2,6-dienyl mercaptan and 3,11,11-trimethyl-7-ethyltrideca-2,6-dienyl mercaptan.

EXAMPLE 5

To a solution of 2 g. of sodium in 50 ml. of methanol at 0° is added 4.5 g. of methyl mercaptan. After about 0.5 hour, 20 g. of 1-bromo-3,7,11,11-tetramethyldodeca-2,6-diene is added and then the mixture refluxed for about 2 hours. The solvent is evaporated and the concentrate taken up in petroleum ether which is washed with water, dried over magnesium sulfate and evaporated under reduced pressure to yield methyl mercaptan 3,7,11,11-tetramethyldodeca-2,6-dienyl (3,7,11,11-tetramethyldodeca-2,6-dienylthiomethane) which can be purified by chromatography.

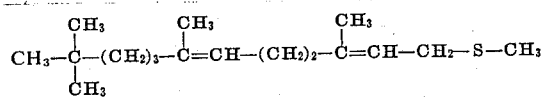

EXAMPLE 6

The process of Example 5 is repeated with the exception of replacing methyl mercaptan with an equivalent amount of 3,4-methylenedioxyphenylmercaptan to yield 1-(3',4'-methylenedioxyphenyl)thio-3,7,11,11-tetramethyldodeca-2,6-diene.

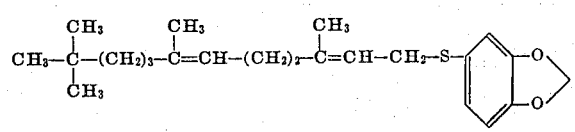

Similarly, 3,4-methylenedioxyphenylmercaptan is reacted with other C-1 halides described herein, such as the C-1 bromides or iodides listed in Column III and VI to yield the corresponding 3',4'-methylenedioxyphenylthio ethers.

EXAMPLE 7

A mixture of 1-bromo-3,7,11,11-tetramethyldodeca-2,6-diene (400 mg.), sesamol (resublimed, 310 mg.), potassium carbonate (anhydrous, 155 mg.) and dimethylacetamide (5 ml.) is heated under reflux for 3 hours. The mixture is then poured into water and extracted with pentane. The crude product is purified by preparative thin-layer chromatography eluting with hexane containing 1 percent ethyl acetate to yield 1-(3',4'-methylenedioxyphenoxy)-3,7,11,11-tetramethyldodeca-2,6-diene.

EXAMPLE 8

Three grams of methyl p-hydroxybenzoate and 5 g. of 1-bromo-3,7,11,11-tetramethyldodeca-2,6-diene are added at 20° to methanolic sodium methoxide (0.5 g. of sodium and 7 ml. of methanol) and the mixture refluxed for 4 hours. After cooling to about 20°, the sodium bromide is filtered off and the filtrate concentrated. The concentrate is diluted with water and then extracted with ether. The ethereal extracts are combined, dried over sodium sulfate and evaporated under reduced pressure to yield methyl 4-(3,7,11,11,-tetramethyldodeca-2,6-dienyloxy)benzoate which can be purified by chromatography on silica.

EXAMPLE 9

The process of Example 5 is repeated with the exception of replacing methyl mercaptan with an equivalent amount of each of ethyl mercaptan, n-butyl mercaptan, cyclohexyl mercaptan, benzyl mercaptan and α-phenylethyl mercaptan to yield 3,7,11,11-tetramethyldodeca-2,6-dienylthioethane, 3,7,11,11-tetramethyldodeca-2,6-dienylthio-n-butane, 3,7,11,11-tetramethyldodeca-2,6-dienylthiocyclohexane, benzylmercapto 3,7,11,11-tetramethyldodeca-2,6-dienyl and α-phenylethylmercapto 3,7,11,11-tetramethyldodeca-2,6-dienyl.

Each of 1-bromo-3,7,11,11-tetramethyltrideca-2,6-diene and 1-bromo-3,11,11-trimethyl-7-ethyltrideca-2,6-diene is converted into 3,7,11,11-tetramethyltrideca-2,6-dienylthiomethane and 3,11,11-trimethyl-7-ethyltrideca-2,6-dienylthiomethane, respectively, using the process of Example 5.

EXAMPLE 10

To 210 ml. of a 0.5M solution metaperiodate (aqueous methanol 1/1) at 0° is added 0.1 mole of 3,7,11,11-tetramethyldodeca-2,6-dienylthiomethane. The mixture is stirred at 0° for 4 hours and then filtered to remove precipitated sodium iodate. The filtrate is diluted with water and then extracted with chloroform. The extract is dried over magnesium sulfate and solvent removed by evaporation under reduced pressure to yield methyl 3,7,11,11-tetramethyldodeca-2,6-dienylsulfoxide which can be purified by chromatography on silica.

By use of the above process, each of 3,7,11,11-tetramethyldodeca-2,6-dienylthioethane, 3,7,11,11-tetramethyldodeca-2,6-dineylthiocyclohexane, benzylmercapto 3,7,11,11-tetramethyldodeca-2,6-dienyl and 1-(3',4'-methylenedioxyphenyl)thio-3,7, 11,11-tetramethyldodeca-2,6-diene is converted into ethyl 3,7, 11,11-tetramethyldodeca-2,6-dienylsulfoxide, cyclohexyl 3,7,11,11-tetramethyldodeca-2,6-dienylsulfoxide, benzyl 3,7,11,11-tetramethyldodeca-2,6-dienylsulfoxide and 3,4-methylenedioxyphenyl 3,7,11,11-tetramethyldodeca-2,6-dienylsulfoxide, respectively.

EXAMPLE 11

To 200 ml. of aqueous methanol (1/1) containing 0.2 moles of sodium metaperiodate is added 0.1 mole of 3,7,11,11-tetramethyldodeca-2,6-dienylthiomethane. The mixture is maintained at about 30° for 6 hours. After cooling, the mixture is filtered to remove precipitated sodium iodate. The filtrate is diluted with water and then extracted with chloroform. The extract is dried over magnesium sulfate and solvent removed by evaporation to yield methyl 3,7,11,11-tetramethyldodeca-2,6-dienylsulfone which can be purified by chromatography on silica.

Using the above process, other sulfides described herein of formula IV can be converted into the sulfonyl compounds of formula VI.

EXAMPLE 12

Compositions useful for the control of insects in accordance with the present invention are exemplified by the following which are applied by spraying to provide about 1 pound of active component per acre surface area. Parts by weight.

| | Parts |
|---|---|
| 1-(3',4'-methylenedioxyphenoxy)-3,7,11,11-tetramethyldodeca-2,6-diene | 2 |
| Cottonseed oil | 98 |
| Ethyl ether of 3,7,11,11-tetramethyltrideca-2,6-dien-1-ol | 4 |
| Cottonseed oil | 96 |

What is claimed is:

1. A compound selected from those of the following formula:

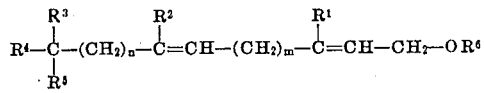

wherein, m is an integer of 1 to 4;

n is an integer of 1 to 4;

each of $R^1$, $R^2$, $R^3$, $R^4$ and $R^5$ is lower alkyl; and $R^6$ is 3',4'-methylenedioxyphenyl or 3',4'-methylenedioxybenzyl.

2. A compound according to claim 1 wherein each of $R^1$, $R^2$, $R^3$, $R^4$ and $R^5$ is methyl or ethyl; and each of $m$ and $n$ is 2 or 3.

3. A compound according to claim 2 wherein $R^6$ is 3',4'4. A compound according to claim 3 wherein each of $R^1$, $R^2$, $R^3$ and $R^5$ is methyl; $R^4$ is methyl or ethyl; and $m$ is 2.

5. A compound according to claim 3 wherein each of $R^1$, $R^3$ and $R^5$ is methyl; each of $R^2$ and $R^4$ is ethyl; and $m$ is 2.

6. A compound according to claim 4 wherein $R^4$ is methyl and $n$ is three.

* * * * *